United States Patent
Hwang et al.

(10) Patent No.: US 10,263,969 B2
(45) Date of Patent: Apr. 16, 2019

(54) METHOD AND APPARATUS FOR AUTHENTICATED KEY EXCHANGE USING PASSWORD AND IDENTITY-BASED SIGNATURE

(71) Applicant: Electronics and Telecommunications Research Institute, Daejeon (KR)

(72) Inventors: Jung-Yeon Hwang, Daejeon (KR); Seok-Hyun Kim, Daejeon (KR); Soo-Hyung Kim, Daejeon (KR); Seung-Hyun Kim, Daejeon (KR); Jong-Hyouk Noh, Daejeon (KR); Sang-Rae Cho, Daejeon (KR); Young-Seob Cho, Daejeon (KR); Jin-Man Cho, Daejeon (KR); Seung-Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 145 days.

(21) Appl. No.: 15/372,562

(22) Filed: Dec. 8, 2016

(65) Prior Publication Data

US 2017/0339118 A1 Nov. 23, 2017

(30) Foreign Application Priority Data

May 17, 2016 (KR) .................. 10-2016-0060391

(51) Int. Cl.
*H04L 9/32* (2006.01)
*H04L 29/06* (2006.01)
(Continued)

(52) U.S. Cl.
CPC .............. *H04L 63/061* (2013.01); *H04L 9/14* (2013.01); *H04L 9/3013* (2013.01); *H04L 9/3247* (2013.01); *H04L 63/083* (2013.01)

(58) Field of Classification Search
CPC ... H04L 63/061; H04L 9/3247; H04L 9/3013; H04L 63/083; H04L 9/14
(Continued)

(56) References Cited

U.S. PATENT DOCUMENTS 6,757,825 B1 6/2004 MacKenzie et al.
8,042,155 B1 * 10/2011 Chang .................. H04L 63/0838
709/217

(Continued)

FOREIGN PATENT DOCUMENTS

EP 2 731 310 A1 5/2014
KR 10-2004-0037801 A 5/2004
(Continued)

OTHER PUBLICATIONS

Jung Yeon Hwang et al., "Robust Authenticated Key Exchange Using Passwords and Identity-based Signatures", Secutiry Standardisation Resarch, 2015, pp. 1-27.
(Continued)

*Primary Examiner* — Mohammad W Reza

(57) ABSTRACT

Disclosed herein are an apparatus and method for authenticated key exchange using a password and an identity-based signature, by which robustness is provided in order to prevent a server impersonation attack when a password is exposed, and by which a client may be provided with convenient authentication using an ID and a password.

19 Claims, 4 Drawing Sheets

(51) Int. Cl.
  *H04L 9/14* (2006.01)
  *H04L 9/30* (2006.01)
(58) Field of Classification Search
  USPC .......................................................... 713/171
  See application file for complete search history.

(56) References Cited

U.S. PATENT DOCUMENTS

| | | |
|---|---|---|
| 2006/0088194 A1 | 4/2006 | Lee et al. |
| 2014/0122888 A1 | 5/2014 | Yoon et al. |
| 2015/0134969 A1 | 5/2015 | Kim et al. |
| 2015/0349960 A1* | 12/2015 | Bagley .................. H04L 9/3242 |
| | | 713/168 |

FOREIGN PATENT DOCUMENTS

| | | |
|---|---|---|
| KR | 10-2014-0057134 A | 5/2014 |
| KR | 10-2014-0059912 A | 5/2014 |

OTHER PUBLICATIONS

Kyu Young Choi et al., "Constructing Efficient PAKE Protocol from Identity-Based KEM/DEM", Information Security Application, 2015, pp. 1-12.

* cited by examiner

METHOD AND APPARATUS FOR AUTHENTICATED KEY EXCHANGE USING PASSWORD AND IDENTITY-BASED SIGNATURE

CROSS REFERENCE TO RELATED APPLICATION

This application claims the benefit of Korean Patent Application No. 10-2016-0060391, filed May 17, 2016, which is hereby incorporated by reference in its entirety into this application.

BACKGROUND OF THE INVENTION

1. Technical Field

The present invention relates generally to a method and apparatus for authenticated key exchange and, more particularly, to a method and apparatus for authenticated key exchange using a password and an identity-based signature in order to provide robustness against attacks that impersonate a server for providing service to clients.

2. Description of the Related Art

Since the public key agreement protocol was proposed by Diffie and Hellman in 1976, key agreement protocols based on various authentication methods have been actively researched. Because the Diffie-Hellman key agreement protocol proposed in early days is vulnerable to man-in-the-middle attacks, research for combining various authentication methods with the key agreement protocols has become a priority in order to defend against such attacks. The Authenticated Key Exchange (AKE) protocols guarantee that participants are authentic and enable the calculation of a shared key between the participants. Here, the calculated key may be used for various security purposes, such as the establishment of a secure communication session, data encryption, data integrity verification, authentication and the like.

Meanwhile, Password-based Authenticated Key Exchange (PAKE) protocols are representative authenticated key exchange protocols in a client/server model. Currently, various PAKE protocols have been put forth as international standards in ISO/IEC 11770-4, IEEE P. 1363 and the like. The procedures performed between a client and a server according to the PAKE protocols are as follows. A client selects its first password (PW) and registers the PW or a 'verifier', which is a variation of a PW, in a server. The password is used as an authentication means when key exchange is performed. Because the client does not store any secret information in a device but merely uses the low-entropy password, which is easy to remember, the PAKE protocols are advantageous in that authentication is simple.

However, the PAKE protocols are vulnerable to impersonation attacks when a password is exposed because the authentication of a client and server is verified using only a password. Recently, a number of cases involving the exposure of passwords have been reported, and with the spread of personal devices having limited resources, the exposure of passwords frequently occurs in client devices, and is regarded as a serious threat.

Particularly, because services in a highly developed IT environment are based on various architectures in which service providers provide clients with sensitive and important information (health information, financial information and the like), as in a big data service, a cloud service or the like, the prevention of a server (service provider) impersonation attack is regarded as an important issue in the activation of such services. In order to solve this problem, it is necessary to employ another authentication means that is stronger than the method in which a server uses a simple password.

SUMMARY OF THE INVENTION

Accordingly, the present invention has been intended to solve the above problems, and an object of the present invention is to provide a method and apparatus for authenticated key exchange using a password and an identity-based signature, by which robustness is provided in order to prevent a server impersonation attack, which may arise from exposure of a password, and by which a client may be provided with convenient authentication using an ID and a password.

The technical objects of the present invention are not limited to the above-mentioned object, and other technical objects that have not been mentioned will be clearly understood from the following description by those skilled in the art.

First, in order to accomplish the above object, there is provided a method for authenticated key exchange between a first device of a client and a second device, which is a service server, in order to provide robustness against an impersonation attack by an attacker even when a password of the client is exposed, according to one aspect of the present invention, the method including creating, by the first device, a predetermined message ($T_c$) using an ID ($ID_c$) and a password ($pw_c$) of the first device, and sending the predetermined message to the second device; creating, by the second device, a message ($T_s$) to be sent using the password ($pw_c$) and an ID ($ID_s$) of the second device and sending, by the second device, the message ($T_s$) to the first device such that a signature value ($\sigma_s$) for the message ($T_s$) is created using a signature key ($sk_s$) and such that a signed message including [$ID_s$, Y (information for verifying $pw_c$), $\sigma_s$] is sent to the first device; and verifying, by the first device, $\sigma_s$ using $ID_s$ as a verification key of a signature verification algorithm in order to check whether $pw_c$ is authentic whenever receiving the signed message.

Sending the predetermined message may be configured such that an equation $W=g^x g_1^{H_1(pw_c)}$ is calculated, and a message including [$ID_c$, W] is sent, where x denotes a selected random number, g and $g_1$ denote discrete logarithm parameters, and $H_1$ denotes a hash function.

Sending the signed message to the first device may be configured such that an equation $Y=g^y g_1^{H_1(pw_c)}$ is calculated, the signature value ($\sigma_s$) for the message to be sent, which includes Y and $ID_s$, is created using the signature key ($sk_s$), and the signed message, which includes [$ID_s$, Y, $\sigma_s$], is sent, where y denotes a selected random number, g and $g_1$ denote discrete logarithm parameters, and $H_1$ denotes a hash function.

Also, sending the signed message to the first device may be configured such that an equation $Y=g^y$ is calculated, the signature value ($\sigma_s$) for the message to be sent, which includes Y and $ID_s$, is created using the signature key ($sk_s$), and the signed message, which includes [$ID_s$, Y, $\sigma_s$], is sent, where y denotes a selected random number, and g denotes a discrete logarithm parameter.

The method may further include providing a service according to a session key, the session key (ssk) being calculated individually by the first device and the second device and being shared therebetween, when the verifying succeeds.

The method may further include calculating, by the second device, equations $X'=Wg_1^{-H_1(pw_c)}$ and $K=X'^y=g^{xy}$ using an equation $W=g^x g_1^{H_1(pw_c)}$, and calculating a session key (ssk) to be shared with the first device, using K, $ID_c$, $ID_s$, W, Y and $\sigma_s$, where x denotes a selected random number.

The method may further include calculating, by the first device, an equation $K=(Y')^x$ using an equation $Y'=Yg_1^{-H_1(pw_c)}$, and calculating a session key (ssk) to be shared with the second device, using K, $ID_c$, $ID_s$, W, Y and $\sigma_s$, where x denotes a selected random number.

Also, the method may further include calculating, by the first device, equations $K=(Y)^x$, and calculating a session key (ssk) to be shared with the second device, using K, $ID_c$, $ID_s$, W, Y and $\sigma_s$, where x denotes a selected random number.

Each of the first device and the second device may use a combination of an arbitrary Password-Based Authenticated Key Exchange (PAKE) protocol and an ID-based signature scheme, which may be implemented by combining respective modules for performing the protocol and the scheme.

Also, an apparatus for authenticated key exchange according to another aspect of the present invention includes a first device of a client, for providing robustness against an attack that impersonates a second device corresponding to a service server even when a password of the client is exposed, wherein the first device includes a first unit for creating a predetermined message ($T_c$) using an ID ($ID_c$) and a password ($pw_c$) of the first device, and for sending the predetermined message to the second device; and a second unit for verifying a signed message whenever receiving the signed message from the second device, which creates the signed message based on the password ($pw_c$) and an ID ($ID_s$) of the second device, wherein the second device creates a message ($T_s$) to be sent using the password ($pw_c$) and the ID ($ID_s$) of the second device, creates a signature value ($\sigma_s$) for the message ($T_s$) using a signature key ($sk_s$), and sends the signed message including [$ID_s$, Y (information for verifying $pw_c$), $\sigma_s$] to the first device, and wherein the second unit verifies $\sigma_s$ using $ID_s$ as a verification key of a signature verification algorithm in order to check whether $pw_c$ is authentic.

The first unit may calculate an equation $W=g^x g_1^{H_1(pw_c)}$ and send a message including [$ID_c$, W] to the second device, where x denotes a selected random number, g and $g_1$ denote discrete logarithm parameters, and $H_1$ denotes a hash function.

In order to send the signed message from the second device to the first device, the second device may calculate an equation $Y=g^y g_1^{H_1(pw_c)}$, create the signature value ($\sigma_s$) for the message to be sent, which includes Y and $ID_s$, using the signature key ($sk_s$), and send the signed message, which includes [$ID_s$, Y, $\sigma_s$], where y denotes a selected random number, g and $g_1$ denote discrete logarithm parameters, and $H_1$ denotes a hash function.

Also, in order to send the signed message from the second device to the first device, the second device may calculate an equation $Y=g^y$, create the signature value ($\sigma_s$) for the message to be sent, which includes Y and $ID_s$, using the signature key ($sk_s$), and send the signed message, which includes [$ID_s$, Y, $\sigma_s$], where y denotes a selected random number, and g denotes a discrete logarithm parameter.

When the second unit succeeds in the verification, the first device and the second device may individually calculate a session key (ssk) and share the session key therebetween, whereby a service may be provided according to the session key.

The second device may calculate equations $X'=Wg_1^{-H_1(pw_c)}$ and $K=X'^y=g^{xy}$ using an equation $W=g^x g_1^{H_1(pw_c)}$, and calculate a session key (ssk) for providing a service, which is to be shared with the first device, using K, $ID_c$, $ID_s$, W, Y and $\sigma_s$, where x denotes a selected random number.

The second unit may calculate an equation $K=(Y')^x$ using an equation $Y'=Yg_1^{-H_1(pw_c)}$ and and calculate a session key (ssk) for providing a service, which is to be shared with the second device, using K, $ID_c$, $ID_s$, W, Y and $\sigma_s$, where x denotes a selected random number.

Also, the second unit may calculate equations $K=(Y)^x$, and calculate a session key (ssk) to be shared with the second device, using K, $ID_c$, $ID_s$, W, Y and $\sigma_s$, where x denotes a selected random number.

Each of the first device and the second device may use a combination of an arbitrary Password-Based Authenticated Key Exchange (PAKE) protocol and an ID-based signature scheme, which may be implemented by combining respective modules for performing the protocol and the scheme.

The method and apparatus for authenticated key exchange using a password and an identity-based signature according to the present invention provide robustness in order to effectively prevent attackers from successfully performing server impersonation attacks even when a password of a client is exposed, and enables a client and a server to perform a key agreement protocol while mutually authenticating each other. Therefore, the present invention is applicable as a security solution in services for providing sensitive information related to finances, health, medical treatment and the like, and in a big data service or a cloud service in which authentication is required, such as Financial Technology (FinTech), health care and the like, whereby the present invention may contribute to activation of the related industries.

Also, because the present invention only uses a password and the identity of the user as an authentication means, it may be widely used as a simple authentication and key agreement method. Here, the password is secret information that is easy to remember, and known information may be used as the ID of the user. For example, known information, such as a company name, a product name or the like, may be used as a server ID. Therefore, authentication may be simply performed and may be widely used by being applied to smart devices.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
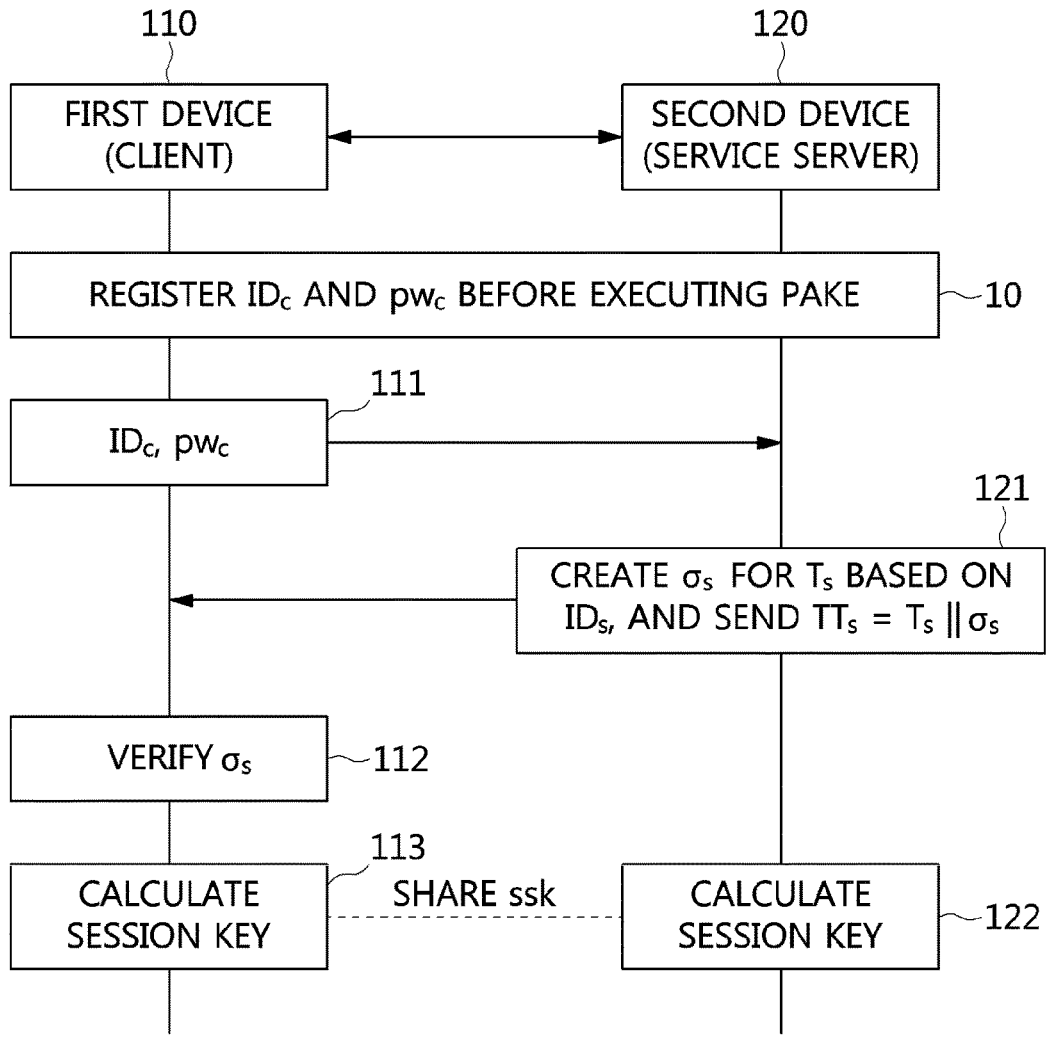
FIG. 1 is a view illustrating an apparatus for authenticated key exchange using a password and an identity-based signature according to an embodiment of the present invention.

Hereinafter, embodiments of the present invention will be described in detail with reference to the accompanying drawings. It should be noted that the same reference numerals are used to designate the same or similar elements throughout the drawings. In the following description of the present invention, detailed descriptions of known functions and configurations which are deemed to make the gist of the present invention obscure will be omitted.

Various terms, such as "first", "second", "A", "B", "(a)", "(b)", etc., can be used to differentiate one component from the other, but the substances, order or sequence of the components are not limited by the terms. Unless differently defined, all terms used here, including technical or scientific terms, have the same meanings as the terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

FIG. 1 is a view illustrating an apparatus for authenticated key exchange using a password and an identity-based signature according to an embodiment of the present invention.

Referring to FIG. 1, an authenticated key exchange apparatus 100 according to an embodiment of the present invention includes a first device 110 and a second device 200. In the present specification, the devices may be a physical means designed such that a specific value is output for an input value, or may be understood as the implementation of a software algorithm. However, the devices are not limited to these examples, and the functions of each of the devices may be performed by being combined or separated depending on the design thereof. Furthermore, the devices may be combined into a single device, so that the functions of the devices may be implemented in the single device, and an additional device may be further included.

Here, the first device 110 and the second device 120 are devices for executing the authenticated key exchange protocol using a password and a signature based on an identity (ID) according to the present invention. In this case, the first device 110 may be a client terminal, and the second device 120 may be a service server for providing services to the first device 110.

For example, a client terminal corresponding to the first device 110 and a service server corresponding to the second device 120 may be interconnected with each other via wired and/or wireless networks, which support wired Internet communication, wireless Internet communication such as Wi-Fi, WiBro and the like, mobile communication such as WCDMA, LTE and the like, or Wireless Access in Vehicular Environment (WAVE) mobile communication. The client terminal corresponding to the first device 110 includes a mobile terminal such as a smart phone, a wearable device through which a voice or video call may be made, a tablet PC, a laptop computer or the like. Also, depending on the communication environment, the client terminal may include a wired terminal such as a desktop PC or various devices having communication functions.

For example, the authenticated key exchange protocol using a password and an ID-based signature according to the present invention may be applied as a security solution in order for a service server corresponding to the second device 120 to provide, over the above-described network, the first device 110 with a service for providing sensitive information such as that related to finances, health, medical treatment or the like, or a big data/cloud service in which an authentication procedure is required, such as Financial Technology (FinTech), health care or the like.

In FIG. 1, it is assumed that the first device 110 and the second device 120 acquire predetermined secret information to be used for ID-based authentication, which includes a password, an ID, a signature key sk and the like, before the authenticated key exchange protocol using a password and an ID-based signature is executed. Here, an ID-based signature may be used for the ID-based authentication. An ID-based signature scheme consists of four algorithms, which are Setup, Key Extraction, Signing and Verification algorithms. In this regard, ISO/IEC standards 14888-2:2008 or other references may be referred to.

For example, the Setup algorithm is configured such that a security parameter is input, and a master secret key msk of a system and system public parameters params corresponding thereto may be output. The Key Extraction algorithm is configured such that the system public parameters params, the master secret key msk, and the ID of a signer are input, and a signature key sk corresponding thereto is output. The Signing algorithm is configured such that the system public parameters params, the ID of the signer, the signature key sk, and a message to be signed are input, and a signature value σ is output. The Verification algorithm is configured such that the system public parameters params, the ID of the signer, the signature value σ, and the signed message are input and whether the signature is valid is output. The ID-based signature scheme may easily verify the signature value σ because the ID of the signer may be used as the public key of the signature. Also, the ID-based signature scheme may be variously configured using various mathematical principles.

The present invention uses a combination of a Password-Based Authenticated Key Exchange (PAKE) protocol and the above-described ID-based signature scheme, and it may be implemented by combining respective modules for executing the protocol or schemes in each of the devices 110 and 120. For example, as the PAKE protocol of the present invention, any one of the international standard PAKE protocols specified in ISO/IEC 11770-4 or IEEE P. 1363 may be used.

In FIG. 1, before executing the authenticated key exchange protocol, the first device (client terminal) 110 creates a password $pw_c$ for its ID $ID_c$ according to a predetermined policy based on the given PAKE protocol. Also, in order to perform a registration process depending on the procedure required by the second device (service server) 120, the first device 110 provides its secret information $ID_c$ and ply, to the second device (service server) 120 at step 10.

The second device (service server) 120 has a signer's ID $ID_s$ and a signature key sk, which have been created in advance. According to the given PAKE protocol, any one entity among the first device (client terminal) 110 and the second device (service server) 120 may start the PAKE protocol. Regardless of the entity that starts the PAKE protocol, a message sent by the second device (service server) 120 always includes a signature value, which is created based on the ID-based signature scheme.

For example, in order to execute the authenticated key exchange protocol, the first device (client terminal) 110 (for example, the means for sending secret information) sends a message that includes an ID $ID_c$ and a password $pw_c$ at step 111.

The second device (service server) 120 executes a server-side part in the given PAKE protocol. Here, the following process is additionally performed at each step. While the PAKE protocol is executed, whenever the second device (service server) 120 sends a message $T_s$, which is created using its ID $ID_s$ and the password $pw_c$ of the first device (client terminal) 110 according to the PAKE protocol, the second device (service server) 120 creates a signature value $\sigma_s$ for the message $T_s$ using its secret signature key $sk_s$, and sends the first device (client terminal) 110 a signed message $TT_s=T_s\|\sigma_s$, which includes [$ID_s$, Y (information for verifying $pw_c$), $\sigma_s$], at step 121.

The first device (client terminal) 110 executes a client-side part in the given PAKE protocol. Here, the following process is additionally performed at each step. Whenever receiving the message $TT_s=T_s\|\sigma_s$ from the second device (service server) 120, the first device (client terminal) 110 verifies the signature value $\sigma_s$, included in the message $TT_s=T_s\|\sigma_s$, using the ID $ID_s$ of the second device (service server) 120 as a verification key, and thereby checks whether $pw_c$ is authentic at step 112. If the verification fails, the first device (client terminal) 110 stops the execution of the PAKE protocol. Conversely, if the verification succeeds, the first device (client terminal) 110 continues the execution of the client-side part in the PAKE protocol.

After the above-mentioned process is performed, each of the first device (client terminal) 110 and the second device (service server) 120 individually calculates a session key ssk and shares the session key therebetween at steps 113 and 122. Then, the provision of the service is processed according to the shared session key ssk.

Hereinafter, the execution of the PAKE protocol between the first device 110 and the second device 120 will be described in detail with reference to the authenticated key exchange method in FIG. 2 and FIG. 3.

Figure 2:
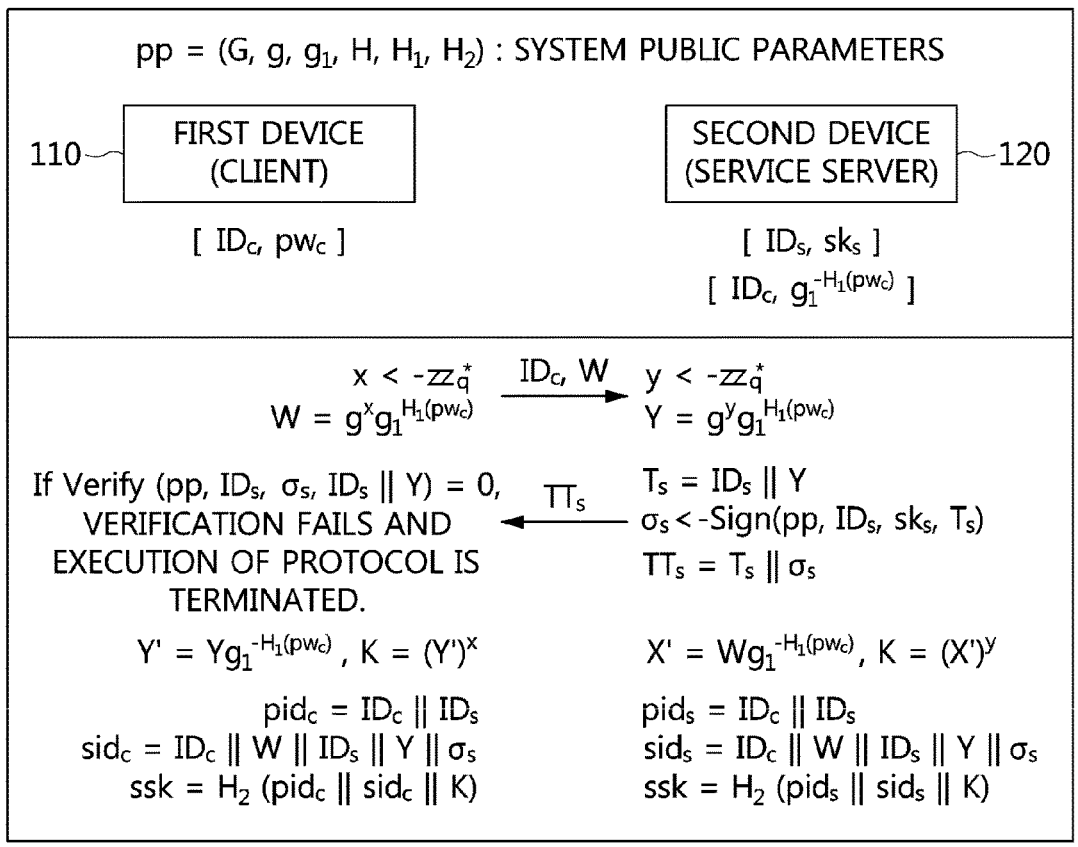
FIG. 2 is a view for describing an example of a method for authenticated key exchange using a password and an identity-based signature in an authenticated key exchange apparatus according to an embodiment of the present invention.

FIG. 2 is a view for describing an example of a method for authenticated key exchange using a password and an ID-based signature in an authenticated key exchange apparatus according to an embodiment of the present invention. FIG. 3 is a view for describing an example of a method for authenticated key exchange using only an ID-based signature in an authenticated key exchange apparatus according to an embodiment of the present invention.

Figure 3:
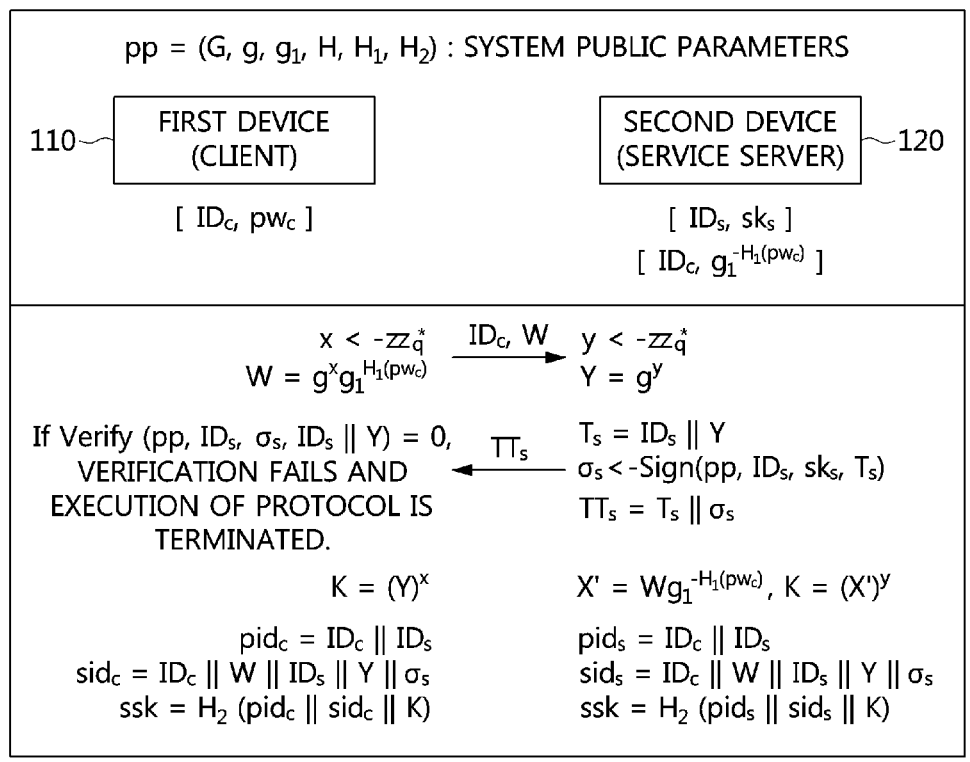
FIG. 3 is a view for describing an example of a method for authenticated key exchange using an identity-based signature in an authenticated key exchange apparatus according to an embodiment of the present invention.

Referring to FIGS. 2 and 3, an authenticated key exchange method that executes the PAKE protocol and additionally uses an ID-based signature scheme in the authenticated key exchange apparatus according to an embodiment of the present invention is based on the well-known Diffie-Hellman key agreement protocol.

To this end, the system public parameter pp, which may be accessed by anybody, includes G, g, $g_1$, H, $H_1$ and $H_2$. Here, G denotes an algebraic group in which a rank is a prime number q, and g and $g_1$ are random generators of the group G. Discrete logarithm parameters G, q, g and $g_1$ are as defined in the literature. For the convenience of description, $Z_q$ is defined as the set $\{0, 1, \ldots, q-1\}$. The three independent hash functions having cryptographic robustness, that is, H, $H_1$ and $H_2$, serve to convert a random bit string into a fixed length of bit string. The functions H, $H_1$ and $H_2$ may use functions for converting all bit strings that comprise 0 and 1, which is represented as $\{0, 1\}^*$, into a bit string having the length L, L1 and L2, that is, H: $\{0, 1\}^* \rightarrow \{0, 1\}^L$, $H_1$: $\{0, 1\}^* \rightarrow \{0, 1\}^{L1}$, and $H_2$: $\{0, 1\}^* \rightarrow \{0, 1\}^{L2}$.

In FIGS. 2 and 3, the ID and the password of the first device (client terminal) 110 are represented as $ID_c$ and $pw_c$, respectively. Also, the ID and the signature key of the second device (service server) 120 are represented as $ID_s$ and $sk_s$, respectively.

Before performing the authenticated key exchange method, the first device (client terminal) 110 creates the password $pw_c$ for its ID $ID_c$ according to the predetermined policy based on the given PAKE protocol, and registers $ID_c$ and $g_1^{-H_1(pw_c)}$ in the second device (service server) 120. Here, the first device (client terminal) 110 calculates the equation $g_1^{-H_1(pw_c)}$, which corresponds to information for verifying the password, using the password $pw_c$, and may send $ID_c$ and $g_1^{-H_1(pw_c)}$ to the second device (service server) 120 via a secret communication channel. The second device (service server) 120 receives $ID_c$, which is the ID of the first device (client terminal) 110, and $g_1^{-H_1(pw_c)}$ and stores them in a storage means, such as memory or the like.

In order to execute the authenticated key exchange protocol, the first device (client terminal) 110 (i.e. a means for sending secret information) selects a random number x from among the elements in the set $Z_q$, calculates the equation $W=g^x g_1^{H_1(pw_c)}$ and sends [$ID_c$, w] to the second device (service server) 120 through a message at step 111.

Also, whenever the second device (service server) 120 (i.e. a verification means) sends a message T which is created using its ID IDs and the password $pw_c$ of the first device (client terminal) 110 according to the PAKE protocol, the second device (service server) 120 creates a signature value $\sigma_s$ for the message $T_s$ using its secret signature key $sk_s$, and sends the first device (client terminal) 110 a signed message $TT_s=T_s\|\sigma_s$, which includes [$ID_s$, Y (information for verifying $pw_c$), $\sigma_s$] at step 121.

To this end, the second device (service server) 120 (i.e. a verification means) selects a random number y from among the elements in the set $Z_q$ and calculates the equation $Y=g^y g_1^{H_1(pw_c)}$ (or calculates the equation $Y=g^y$ when using only the ID-based signature, as in FIG. 3). Also, the second device (service server) 120 creates a signature value $\sigma_s$ for the message to be sent, $T_s=ID_s\|Y$, which includes Y and $ID_s$, using the signature key $sk_s$. In order to create the signature value $\sigma_s$, a predetermined function 'Sign (pp, $ID_s sk_s$, $T_s$)' may be used.

Whenever receiving the message $TT_s=T_s\|\sigma_s$ from the second device (service server) 120, the first device (client terminal) 110 (i.e. a verification means) verifies the signature value $\sigma_s$, included in the message $TT_s=T_s\|\sigma_s$, using the ID $ID_s$ of the second device (service server) 120 as a verification key according to the verification algorithm, and thereby checks whether $pw_c$ is authentic at step 112. If verification fails, the first device (client terminal) 110 stops the execution of the PAKE protocol, but if verification succeeds, the first device (client terminal) 110 continues to play its role in the PAKE protocol. The first device (client terminal) 110 may send a message concerning whether or not the verification succeeds to the second device (service server) 120.

Through the above-mentioned process, when the verification of the signature value $\sigma_s$ succeeds in the first device (client terminal) 110, the first device (client terminal) 110 (i.e. a session key management means) and the second device (service server) 120 (i.e. a session key management means) individually calculate a session key ssk and share the session key therebetween, whereby the provision of service may be processed according to the shared session key ssk at step 113 and 122.

For example, the second device (service server) 120 calculates the equation $X'=Wg_1^{-H_1(pw_c)}$ and $K=X'^v=g^{xy}$, acquires a predetermined calculation value $pid_s=ID_c\|ID_s$, which is calculated using $ID_c$ and $ID_s$, and acquires a predetermined calculation value $sid_s=ID_c\|W\|ID_s\|Y\|\sigma_s$, which is calculated using $ID_c$, W, $ID_s$, Y and $\sigma_s$. Accordingly, the second device (service server) 120 calculates a session key $ssk=H_2(pid_s\|sid_s\|K)$ using the hash function $H_2$ for K, $pid_s$ and $sid_s$.

In order to calculate the session key ssk, the first device (client terminal) 110 calculates the equation $K=(Y')^x$ (here, $Y'=Yg_1^{-H_1(pw_c)}$ (or calculates the equation $K=(Y)^x=g^{xy}$ when using only the ID-based signature as in FIG. 3). The first device (client terminal) 110 acquires a predetermined calculation value $pid_c (=pid_s)$, which is calculated using $ID_c$ and $ID_s$, and acquires a predetermined calculation value $sid_c (=sid_s)$, which is calculated using $ID_c$, W, $ID_s$, Y and $\sigma_s$. Accordingly, the first device (client terminal) 110 calculates the session key $ssk=H_2(pid_c\|sid_c\|K)$ using the hash function $H_2$ for K, $pid_c$ and $sid_c$.

Figure 4:
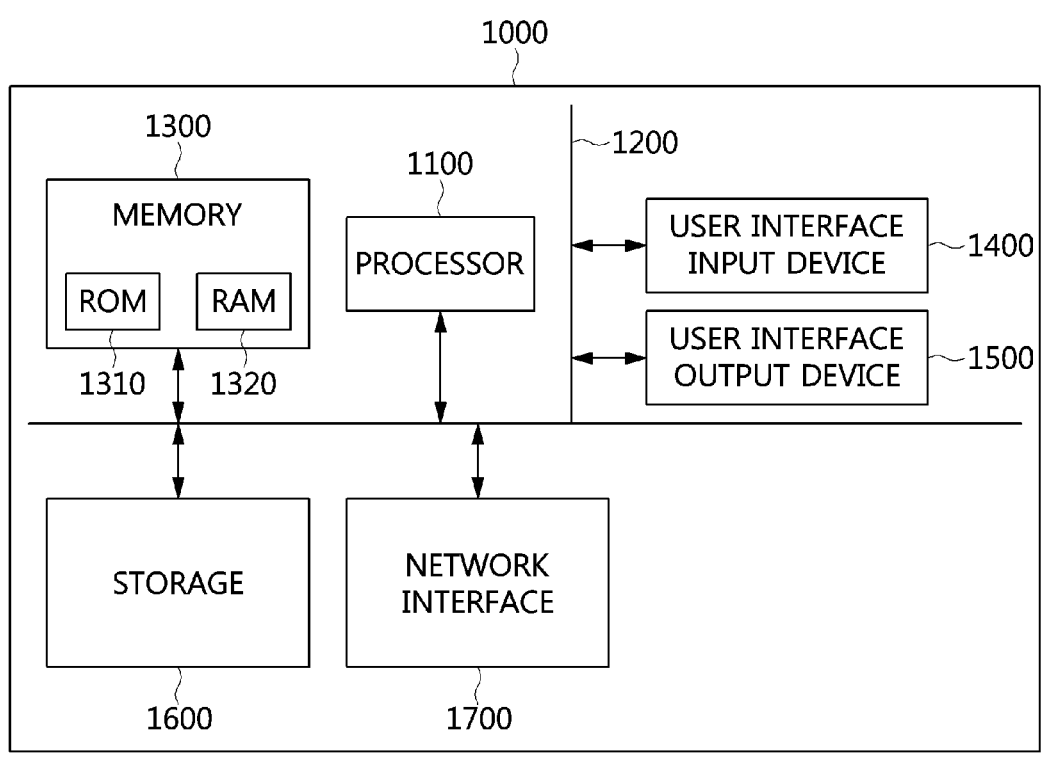
FIG. 4 is a view for describing an example of a method for implementing an authenticated key exchange apparatus 100 according to an embodiment of the present invention.

FIG. 4 is a view for describing an example of a method for implementing an authenticated key exchange apparatus according to an embodiment of the present invention. In the authenticated key exchange apparatus according to an embodiment of the present invention, the first device (client terminal) 110 and the second device (service server) 120 may be implemented as hardware, software or a combination thereof. For example, the authenticated key exchange apparatus of the present invention may be implemented as the computing system 1000 illustrated in FIG. 4.

The computing system 1000 may include at least one processor 1100, memory 1300, a user interface input device 1400, a user interface output device 1500, storage 1600 and a network interface 1700, which are connected with each other via a bus 1200. The processor 110 may be a central processing unit (CPU) or a semiconductor device for processing instructions stored in the memory 1300 and/or the storage 1600. The memory 1300 and the storage 1600 may include various kinds of volatile or nonvolatile storage media. For example, the memory 1300 may include Read Only Memory (ROM) 1310 or Random Access Memory (RAM) 1320.

Accordingly, the step of performing the method or the step of executing the algorithm that has been described in connection with the embodiments disclosed in the present specification may be implemented as hardware, a software module or a combination thereof, which is executed by the processor 1100. The software module may be stored in the storage media, such as RAM, flash memory, ROM, EPROM, EEPROM, a register, a hard disk, a removable disk, or CD-ROM, that is, in the memory 1300 and/or the storage 1600. The exemplary storage media are coupled to the processor 1100, and the processor 1100 may read and interpret information stored in the storage media and write information thereto. In another example, the storage media may be integrated with the processor 1100. The processor integrated with the storage media may be stored in an Application-Specific Integrated Circuit (ASIC). The ASIC may be stored in a user terminal. In other examples, the processor and storage media may be stored in a user terminal as separate components.

The method and apparatus for authenticated key exchange using a password and an identity-based signature according to the present invention provide robustness in order to effectively prevent attackers from successfully performing server impersonation attacks even when a password of a client is exposed, and enables a client and a server to perform a key agreement protocol while mutually authenticating each other. Therefore, the present invention is applicable as a security solution in services for providing sensitive information related to finances, health, medical treatment and the like, and in a big data service or a cloud service in which authentication is required, such as Financial Technology (FinTech), health care and the like, whereby the present invention may contribute to activation of the related industries.

Also, because the present invention only uses a password and the identity of the user as an authentication means, it may be widely used as a simple authentication and key agreement method. Here, the password is secret information that is easy to remember, and known information may be used as the ID of the user. For example, known information, such as a company name, a product name or the like, may be used as a server ID. Therefore, authentication may be simply performed and may be widely used by being applied to smart devices.

The above description merely illustrates the technical spirit of the present invention, and those skilled in the art may make various changes and modifications without departing from the scope of the present invention.

Accordingly, the embodiments, having been disclosed in the present invention, are intended not to limit but to describe the technical spirit of the present invention, and the scope of the technical spirit of the present invention is not limited to the embodiments. The scope of the protection of the present invention must be interpreted by the accompanying claims, and all the technical spirits in the same range as the claims must be interpreted as being included in the scope of the right of the present invention.

What is claimed is:

1. A method for authenticated key exchange between a first device and a second device, the method comprising:

creating, by the first device, a password ($pw_c$) for an identifier (ID) of the first device ($ID_c$);

communicating, by the first device, the password ($pw_c$) to the second device;

performing, by the first device and the second device after the communicating of the password ($pw_c$) to the second device, an authenticated key exchange protocol, including:

creating, by the first device, a first message using the ID ($ID_c$) and a hash value of the password ($pw_c$) of the first device, sending, by the first device, the first message to the second device, creating, by the second device, a second message ($T_s$) using the first message, the hash value of the password ($pw_c$), and an ID ($ID_s$) of the second device, the second message including the ID ($ID_s$) of the second device and an information (Y) for verifying the password ($pw_c$), creating, by the second device, a signature value ($\sigma_s$) for the second message ($T_s$) using a signature key ($sk_s$)

sending, by the second device, a signed message including the second message and the signature value ($\sigma_s$) to the first device, verifying, by the first device in response to receiving the signed message, the signature value ($\sigma_s$) using $ID_s$ as a verification key of a signature verification algorithm.

2. The method of claim 1, wherein creating the first message includes calculating a first value $W=g^x g_1^{H_1(pw_c)}$, and including the first value W and the ID of the first device ($IC_c$) in the first message, where x denotes a random number selected by the first device, g and $g_1$ denote discrete logarithm parameters, and $H_1$ denotes a hash function.

3. The method of claim 2, wherein creating the second message includes determining the information $Y=g^y g_1^{H_1(pw_c)}$, and wherein creating the signature value ($\sigma_s$) is performed using the signature key ($sk_s$) and the second message, where y denotes a random number selected by the second device.

4. The method of claim 2, wherein creating the second message includes calculating the information $Y=g^y$, and wherein creating the signature value ($\sigma_s$) is performed using the signature key ($sk_s$) and the second message, where y denotes a random number selected by the second device.

5. The method of claim 1, further comprising:
determining, by the first device, a session key in response to the success of the verifying of the signature value ($\sigma_s$);
determining, by the second device, the session key; and
providing, in response to the success of the verifying of the signature value ($\sigma_s$), a service using the session key.

6. The method of claim 3, further comprising:
calculating, by the second device, a third value $X'=Wg_1^{-H_1(pw_c)}$ and a fourth value $K=X'^y$, and
calculating a session key (ssk), for use in communicating with the first device, using K, $ID_c$, $ID_s$, W, Y and $\sigma_s$.

7. The method of claim 3, further comprising:
calculating, by the first device in response to the success of the verifying of the signature value ($\sigma_s$), a third value $Y'=Yg_1^{H_1(pw_c)}$ and a fourth value $K=(Y')^x$, and
calculating a session key (ssk), for use in communicating with the second device, using K, $ID_c$, $ID_s$, W, Y and $\sigma_s$.

8. The method of claim 4, further comprising:
calculating, by the first device, a fourth value $K=(Y)^x$, and
calculating a session key (ssk), for use in communicating with the second device, using K, $ID_c$, $ID_s$, W, Y and $\sigma_s$.

9. The method of claim 1, wherein each of the first device and the second device uses a combination of an arbitrary Password-Based Authenticated Key Exchange (PAKE) protocol and an ID-based signature scheme, which is implemented by combining respective modules for performing the protocol and the scheme.

10. An apparatus for performing authenticated key exchange, comprising:
a first device of a client, for providing robustness against an attack that impersonates a second device corresponding to a service server even when a password of the client is exposed,
wherein the first device is configured to:
create a password ($pw_c$) for an identifier (ID) of the first device ($ID_c$);
communicate the password ($pw_c$) to the second device; and
perform, after communicating the password ($pw_c$) to the second device, an authenticated key exchange protocol, including:
creating a first message using the ID ($ID_c$) and a hash value of the password ($pw_c$) of the first device,
sending the first message to the second device,
receiving, from the second device, a signed message including a second message (Ts) and a signature value ($\sigma_s$), the second message (Ts) having been created by the second device using the first message, the hash value of the password ($pw_c$), and an ID ($ID_s$) of the second device, and the second message including the ID (IDs) of the second device and an information (Y) for verifying the password (pwc), and the signature value ($\sigma_s$) having been created by the second device using a signature key ($sk_s$), and
verifying, in response to receiving the signed message, the signature value ($\sigma_s$) using IDs as a verification key of a signature verification algorithm.

11. The apparatus of claim 10, wherein performing the authenticated key exchange protocol further includes determining, by the first device, a session key in response to the success of the verifying of the signature value ($\sigma_s$);
and wherein the first device is further configured to provide, in response to the success of the verifying of the signature value (σs), a service using the session key.

12. The apparatus of claim 10, wherein creating the first message includes calculating a first value $W=g^x g_1^{H_1(pw_c)}$, and including the first value W and the ID of the first device ($ID_c$) in the first message, where x denotes a random number selected by the first device, g and $g_1$ denote discrete logarithm parameters, and $H_1$ denotes a hash function.

13. The apparatus of claim 12, wherein performing the authenticated key exchange protocol further includes:
calculating, by the first device in response to the success of the verifying of the signature value (σs), a third value $Y'=Yg_1^{-H_1(pw_c)}$ and a fourth value $K=(Y')^x$; and
calculating a session key (ssk), for use in communicating with the second device, using K, $ID_c$, $ID_s$, W, Y and $\sigma_s$.

14. The apparatus of claim 12, wherein performing the authenticated key exchange protocol further includes:
calculating, by the first device in response to the success of the verifying of the signature value (σs), a fourth value $K=Y^x$; and
calculating a session key (ssk), for use in communicating with the second device, using K, $ID_c$, $ID_s$, W, Y and $\sigma_s$.

15. An apparatus for performing authenticated key exchange, comprising:
a second device corresponding to a service server, for providing robustness against an attack that impersonates the second device corresponding to the service server even when a password of a first device of a client is exposed,
wherein the second device is configured to:
receive, from the first device, a password ($pw_c$) for an identifier (ID) of the first device ($ID_c$);
perform, after receiving the password ($pw_c$) from the first device, an authenticated key exchange protocol, including:
receiving a first message from the first device, the first message having been created by the first device using the ID ($ID_c$) and a hash value of the password ($pw_c$) of the first device,
creating a second message (Ts) using the first message, the hash value of the password ($pw_c$), and an ID (IDs) of the second device, the second message (Ts) including the ID ($ID_s$) of the second device and an information (Y) for verifying the password (pwc),
create a signature value ($\sigma_s$) using a signature key ($sk_s$),
create a signed message including the second message (Ts) and the signature value ($\sigma_s$), and
sending the signed message to the first device.

16. The apparatus of claim 15, wherein creating the second message includes determining the information $Y=g^y g_1^{H_1(pw_c)}$, and wherein creating the signature value ($\sigma_s$) is performed using the signature key ($sk_s$) and the second message, where g and $g_1$ denote discrete logarithm parameters, $H_1$ denotes a hash function, and y denotes a random number selected by the second device.

17. The apparatus of claim 15, wherein creating the second message includes calculating the information $Y=g^y$, and wherein creating the signature value ($\sigma_s$) is performed using the signature key ($sk_s$) and the second message, where g and $g_1$ denote discrete logarithm parameters, $H_1$ denotes a hash function, and y denotes a random number selected by the second device.

18. The apparatus of claim 15, wherein performing the authenticated key exchange protocol further includes determining, by the second device, a session key (ssk); and
   and wherein the second device is further configured to provide a service using the session key (ssk).

19. The apparatus of claim 18, wherein the first message includes a password verification value W, and wherein determining the session key (ssk) comprises:
   calculating a third value $X'=W g_1^{-H_1(pw_c)}$ and a fourth value $K=X'^y$, and
   calculating the session key (ssk) using K, $ID_c$, $ID_s$, W, Y and $\sigma_s$, where $g_1$ denotes a discrete logarithm parameter, $H_1$ denotes a hash function, and y denotes a random number selected by the second device.

\* \* \* \* \*